July 28, 1959
G. H. KALEN
2,897,034
INSTRUMENT CASES
Filed Feb. 3, 1958
3 Sheets-Sheet 1
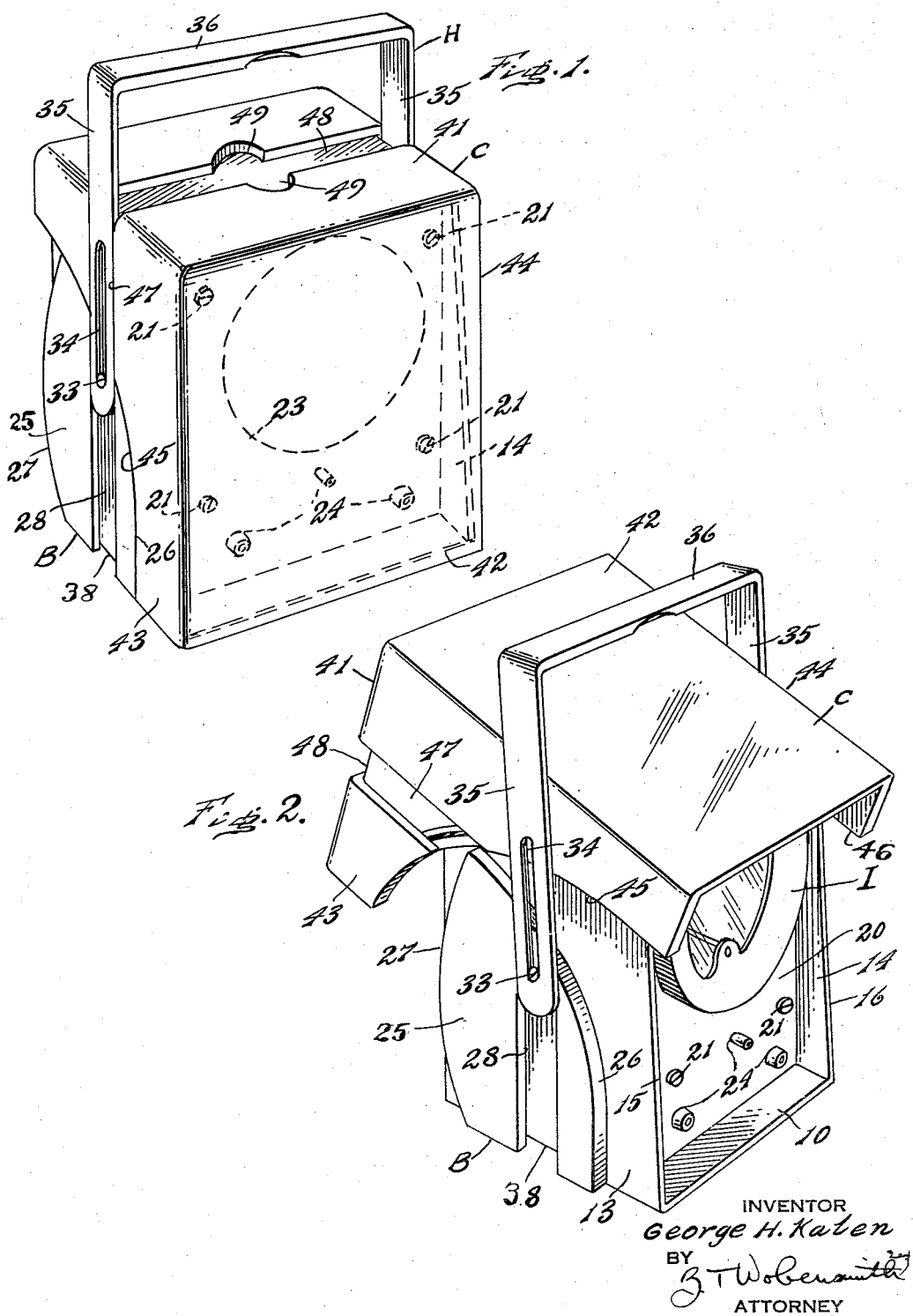
INVENTOR
George H. Kalen
BY
ATTORNEY

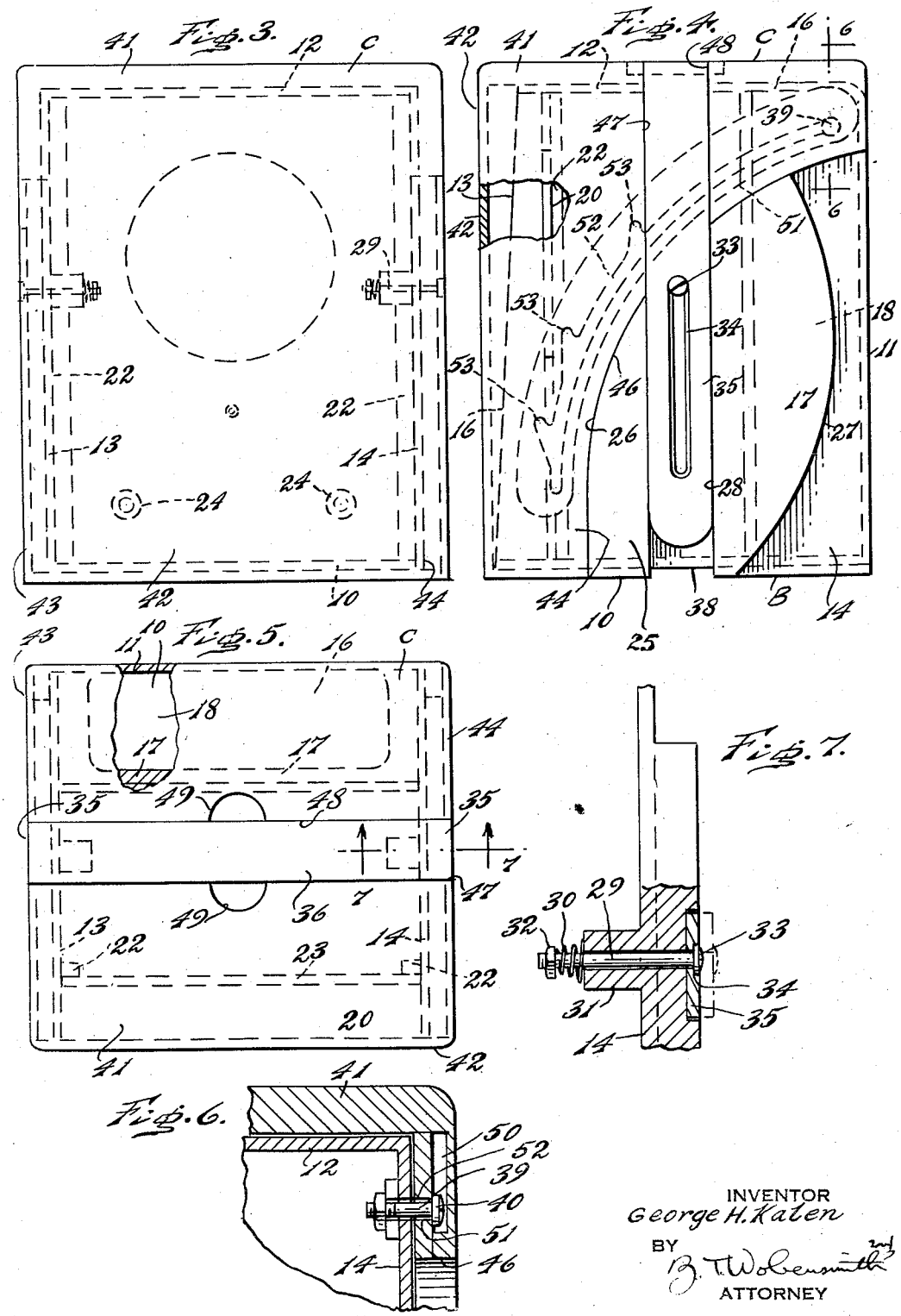

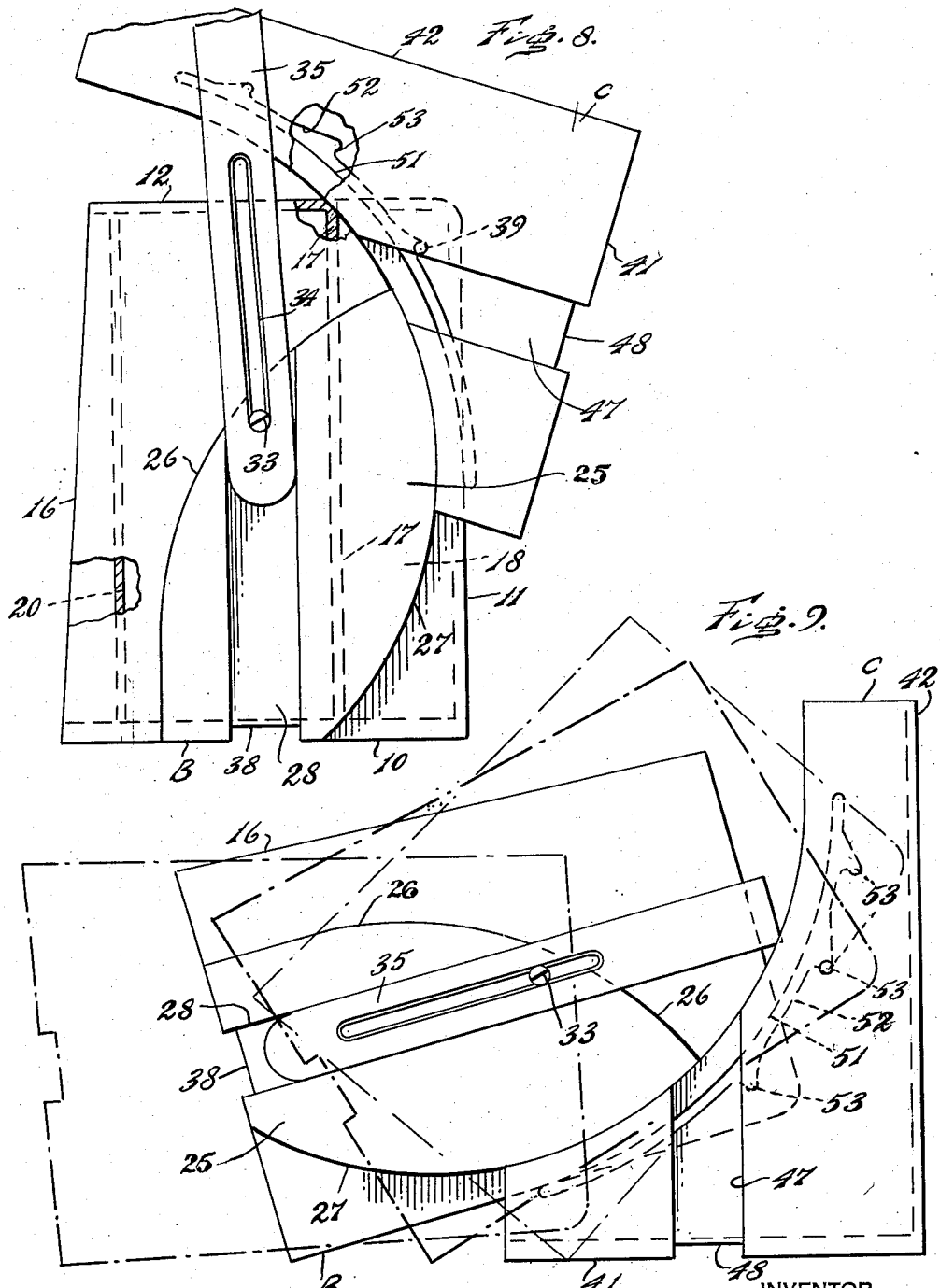

United States Patent Office 2,897,034
Patented July 28, 1959

2,897,034

INSTRUMENT CASES

George H. Kalen, Fort Washington, Pa.

Application February 3, 1958, Serial No. 712,746

12 Claims. (Cl. 312—327)

This invention relates to a case for instruments which serves as an enclosure and also as an adjustable support for the instrument.

Various cases have heretofore been proposed for protecting an instrument during transportation thereof, but these have various limitations, including the use of separable parts which become lost or are not replaced so that injury to the instrument or the cover can occur.

It is the principal object of the present invention to provide an instrument case having as components a body with an instrument mounting and a cover which is permanently but adjustably attached to the body so that the instrument mounting can be supported in any one of a number of different positions.

It is a further object of the present invention to provide an instrument case having as components a body or case with an instrument mounting and a cover adjustably attached to the body or case so as to serve as a stand or prop therefor in one position of adjustment, and in which when the cover is in closed position a splash proof mounting is provided for the instrument.

It is a further object of the present invention to provide an instrument case having as components a body, and a connected cover, and which is provided with a combined carrying handle and cover locking device.

It is a further object of the present invention to provide an instrument case having as components a body, with an instrument mounting, and a connected cover, with a flush mounted but extensible carrying handle and cover locking device.

It is a further object of the present invention to provide an instrument case which is particularly suited for electrical indicating or recording instruments.

Other objects and advantageous features of the invention will be apparent from the description and claims.

The nature and characteristic features of the invention will be more readily understood from the following description, taken in connection with the accompanying drawings forming part thereof, in which:

Figure 1 is a view in perspective of a preferred form of instrument case, with the handle in raised position for carrying the case;

Fig. 2 is a view in perspective of the instrument case showing the cover in partially open position;

Fig. 3 is a front elevational view of the instrument case shown in Fig. 1, in closed condition;

Fig. 4 is a side elevational view of the instrument case shown in Fig. 1, in closed condition, parts being broken away to show the details of construction;

Fig. 5 is a top plan view of the instrument case shown in Fig. 1, in closed condition, parts being broken away to show the details of construction;

Fig. 6 is a fragmentary vertical sectional view taken approximately on the line 6—6 of Fig. 4;

Fig. 7 is a fragmentary vertical sectional view taken approximately on the line 7—7 of Fig. 5;

Fig. 8 is a side elevational view showing the cover in another partially open position, parts being broken away to show the details of construction; and Fig. 9 is a side elevational view showing the cover in supporting relation to the body in a plurality of different positions.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the instrument case preferably includes as components thereof a body B by and in which the instrument I is carried, a movably mounted cover C, and a handle H which can retain the cover C and body B in closed position.

The body B preferably includes a horizontal bottom wall 10, a vertical rear wall 11 connected to and extending perpendicularly upwardly from the bottom wall 10, a horizontal top wall 12 extending perpendicularly from the rear wall 11, and vertical side walls 13 and 14 connecting the bottom wall 10, the rear wall 11 and the top wall 12. The side walls 13 and 14 have front marginal edges 15 and 16 rearwardly inclined towards the top.

Spaced forwardly from the rear wall 11, a vertical interior wall panel 17 is provided, secured to the bottom and top walls 10 and 12. The top wall 12 has an opening 16 therethrough for access to a space 18 above the bottom wall 10 and between the side walls 13 and 14, and the wall 11 and the wall panel 17. The space 18 can serve for the storage of conductors or the like (not shown) or for other articles used with the instrument.

Spaced forwardly from the interior wall panel 17, a vertical instrument mounting panel 20 is provided, removably secured by screws 21 to side rails 22 carried by the side walls 13 and 14.

The panel 20 can be provided with an opening 23 for the insertion of a portion of the instrument I and can have additional openings 24 for leads or the like. The instrument I can be of any desired type, such for example as an electrical indicating or recording meter, or the like.

Each of the side walls 13 and 14 has formed thereon or secured thereto a panel 25 with a front convexly curved guiding edge 26 and a rear convexly curved guiding edge 27.

The panels 25 are also provided with parallel oppositely disposed vertical grooves 28, and near the upper ends thereof, and preferably above the center of the body B, pivots 29 are provided.

The pivots 29 are preferably axially movable and normally urged inwardly by compression springs 30 engaging the inner ends of bosses 31 and nuts 32 on the inner ends of the pivots 29. The pivots 29, at their outer ends, have heads 33 engaging in slots 34 in the side arms 35 of the handle H. The side arms 35 are connected by a cross arm 36 which is adapted for manual engagement for carrying, as hereinafter explained.

The side arms 35 and cross arm 36 provide a resilient handle with the free ends of the side arms 35 separable so that, upon separation as permitted by the springs 30, the handle H may be swung to a position for engagement of the cross arm 36 in a slot or groove 38 formed in the bottom wall 10.

The side walls 13 and 14, at the upper rear portions thereof, are provided with aligned pivots 39 having enlarged heads 40, for purposes to be explained.

The cover C preferably includes a horizontal top wall 41, a vertical front wall 42, and vertical side walls 43 and 44, having corresponding concavely covered guiding edges 45 and 46 for engagement with the edges 26 and 27, as hereinafter explained.

The side walls 43 and 44 are preferably each provided with parallel grooves 47 for alignment with the grooves 28, the grooves 47 being connected by a groove 48 in the top wall for the reception of the side arms 35 and cross arm 36, when the handle H is in closed position. The groove 48 can have extensions 49 therefrom for facilitating access to the handle cross arm 36.

It will be noted that by reason of the disposition of the side arms 35 in engagement in the grooves 47 and simultaneously in engagement in the grooves 27, the cover C, is maintained in locked condition with respect to the body B, at one position of the handle H.

The side walls 43 and 44 of the cover C are provided with arcuate slots 50, T-shaped in cross section (see Fig. 6), aligned with the marginal guiding edges 45 and 46, and within which the heads 40 of the pivots 39 are received (see Figs. 4 and 6).

The slots 50 each has a curved guiding edge portion 51 for free sliding engagement of the shanks of the pivots 39, and an opposite edge portion 52 which is provided with a plurality of indentations 53 also for the reception of the shanks of the pivots 39 for supporting the body B at the desired adjusted position with respect to the cover C.

The mode of operation will now be pointed out.

In normal closed position, the cover C will be disposed as illustrated in Figs. 1, 3, 4 and 5 with the surfaces 45 and 46 of the cover C engaging the surfaces 26 of the body B. The bottom wall 10 of the body B will be available for support. The heads 40 of the pivot pins 39 will be disposed at one end of the grooves 50 and the wall 41 will be disposed upwardly in a horizontal position. The handle H will have the portion 36 thereof in the slot 48 so that it is flush with the wall 41 and will have the side arms 35 in the aligned slots 47 and 28. The handle H, in this position, will hold the cover C in locked position with respect to the body B.

When it is desired to have access to the instrument I, the side arms 35 of the handle H are spread sufficiently against the force of the springs 30, to permit swinging the handle H out of engagement with the grooves 47. This can be effected with the handle H swung either forwardly or rearwardly, or if desired, with the handle H swung downwardly to a position so that the portion 36 is disposed in the groove 38.

The cover C can then be swung to a tilted position, as illustrated in Fig. 2, where it serves as a shield above the instrument I, or the cover C can be further swung to a position, as illustrated in Fig. 9, with the wall 41 facing downwardly and providing a support for the cover C.

The body B can then be swung, by movement of the pins 39 along the grooves 50 and engaged in one of the projections 53 so that the face of the instrument I is inclined at the desired angle, or even lowered to a substantially flat position as indicated in Fig. 9.

During the movement of the cover C with respect to the body B for positioning the same at the desired location, the faces 26 and 27, respectively, engage the faces 45 and 46 and the cover C in its movement to the desired position.

The engagement of the faces 27 with the faces 45 and 47 also aids in supporting the instrument at a tilted position as indicated in Fig. 9.

The handle H can be raised, as desired, for carrying purposes and lowered as desired and whether raised or lowered, still serves to lock the cover C in closed position with respect to the body B and until the legs 35 are spread and swung out of locking engagement.

I claim:

1. A case having a body portion provided with a bottom wall and spaced side walls and an article supporting panel between said side walls, a cover portion having a top wall, a front wall and side walls exteriorly disposed with respect to said first mentioned walls, the side walls of said body portion having a pair of axially aligned pivotal connections, the said walls of said cover portion having inner and outer faces and a pair of elongated slots extending outwardly from said inner faces and terminating inwardly of said outer faces, said slots having a plurality of corresponding indentations spaced therealong, said slots and said pivotal connections being in slidable engagement for preventing separation of said portions and permitting positioning said cover portion as a support for said body portion at a plurality of locations and with said pivotal connections in engagement in selected pairs of said indentations.

2. A case having a body portion provided with a bottom wall and spaced side walls and an article supporting panel between said side walls, a cover portion having a top wall, a front wall and side walls exteriorly slidably disposed with respect to the first mentioned side walls, the side walls of one of said portions having a pair of axially aligned pivotal connections and the side walls of the other of said portions having a pair of elongated slots extending along corresponding margins thereof, said slots having a plurality of corresponding indentations spaced therealong, said slots and said pivotal connections being in slidable engagement for preventing separation of said portions and permitting positioning said cover portion as a support for said body portion at a plurality of tilted positions of said body portion and with said pivotal connections in engagement in selected pairs of said indentations, the side walls of said portions having grooves aligned in one relative position of said portions, and a handle having arms for simultaneous engagement in said grooves in flush relation with said side walls.

3. A case having a body portion provided with a bottom wall and spaced side walls and an article supporting panel between said side walls, a cover portion having a top wall, a front wall and side walls exteriorly slidably disposed with respect to the first mentioned side walls, the side walls of one of said portions having a pair of axially aligned pivotal connections and the side walls of the other of said portions having a pair of elongated slots extending along corresponding margins thereof, said slots having a plurality of corresponding indentations spaced therealong, said slots and said pivotal connections being in slidable engagement for preventing separation of said portions and permitting positioning said cover portion as a support for said body portion at a plurality of tilted positions of said body portion and with said pivotal connections in engagement in selected pairs of said indentations, the side walls of said portions having grooves aligned in one relative position of said portions, and a handle slidably pivotally mounted on one of said portions having arms for simultaneous engagement in said grooves.

4. A case having a body portion provided with a bottom wall and spaced side walls and an article supporting panel between said side walls, a cover portion having a top wall, a front wall and side walls with inner and outer faces, said cover portion being exteriorly slidably disposed with respect to said first mentioned side walls, the side walls of said body portion having a pair of axially aligned pivotal connections with their outer ends terminating interiorly with respect to the outer faces of said cover side walls, the side walls of said cover portion having a pair of elongated slots along corresponding margins of said side walls extending outwardly from said inner faces and terminating inwardly of said outer faces, said slots having a plurality of corresponding indentations spaced therealong, said slots and said pivotal connections being in slidable engagement for preventing separation of said portions and permitting positioning said cover portion as a support for said body portion at a plurality of tilted positions of said body portion and with said pivotal connections in engagement in selected pairs of said indentations.

5. A case having a body portion provided with a bottom wall and spaced side walls and an article supporting panel between said side walls, a cover portion having a top wall, a front wall and side walls with outer faces exteriorly slidably disposed with respect to said first mentioned side walls, the side walls of said body portion having a pair of axially aligned pivotal connections terminating interiorly with respect to the outer faces of said cover side walls and the side walls of said cover portion having a pair of elongated slots extending along corresponding margins thereof and inwardly positioned with respect to said faces of said cover side walls, said slots having a plurality of corresponding indentations spaced therealong, said slots and said pivotal connections being in slidable engagement for preventing separation of said portions and permitting positioning said cover portion as a support for said body portion at a plurality of tilted positions of said body portion and with said pivotal connections in engagement in selected pairs of said indentations, the side walls of said portions having grooves aligned in one relative position of said portions, and a handle having arms for simultaneous engagement in said grooves in flush relation with said side walls.

6. A case having a body portion provided with a bottom wall and spaced side walls and an article supporting panel between said side walls, a cover portion having a top wall, a front wall and side walls with outer faces exteriorly slidably disposed with respect to said first mentioned side walls, the side walls of said body portion having a pair of axially aligned pivotal connections terminating interiorly with respect to the outer faces of said cover side walls and the side walls of said cover portion having a pair of elongated slots extending along corresponding margins thereof and inwardly positioned with respect to said faces of said cover side walls, said slots having a plurality of corresponding indentations spaced therealong, said slots and said pivotal connections being in slidable engagement for preventing separation of said portions and permitting positioning said cover portion as a support for said body portion at a plurality of tilted positions of said body portion and with said pivotal connections in engagement in selected pairs of said indentations, the side walls of said portions having grooves aligned in one relative position of said portions, and a handle slidably pivotally mounted on one of said portions having arms for simultaneous engagement in said grooves.

7. An instrument case having a body portion provided with a bottom wall and spaced side walls and an instrument supporting panel between said side walls, each of said side walls having thereon forwardly and rearwardly facing curved faces, a cover portion having a top wall, a front wall and side walls exteriorly slidably disposed with respect to said first mentioned side walls, said cover side walls having rearwardly facing curved margins complemental in shape to the forwardly facing faces of the body side walls, the side walls of one of said portions having a pair of axially aligned pivotal connections and the side walls of the other of said portions having a pair of elongated slots extending therealong, said slots and said pivotal connections being in slidable engagement for preventing separation of said portions and permitting positioning said cover portion as a support for said body portion at a plurality of tilted positions of said body portion.

8. An instrument case having a body portion provided with bottom, rear and opposite side walls and an upright instrument supporting panel between said side walls, each of said walls having on the exterior thereof forwardly and rearwardly facing curved faces, a cover portion having top and front walls and spaced side walls exteriorly slidably disposed with respect to said first mentioned side walls, said cover side walls having rearwardly facing marginal faces complemental in shape to the forwardly facing faces of said body portion, said body portion having at the upper rear portion of the side walls a pair of axially aligned pivotal connections, and said cover portion having a pair of elongated slots extending along said marginal faces, said slots and said pivotal connections being in slidable engagement for preventing separation of said cover and body portions and permitting positioning said cover portion as a support for said body portion at a plurality of tilted positions of said body portion.

9. An instrument case as defined in claim 8 in which the side walls of said portions have grooves aligned in one relative position of said portions, and a handle is provided having arms for simultaneous engagement in said grooves.

10. An instrument case as defined in claim 8 in which the side walls of said portions have grooves aligned in one relative position of said portions, and a handle slidably pivotally mounted on one of said portions is provided having arms for simultaneous engagement in said grooves.

11. An instrument case having a body portion provided with bottom, rear and opposite side walls and an upright instrument supporting panel between said side walls, each of said side walls having on the exterior thereof forwardly and rearwardly facing curved faces, said side walls having parallel grooves therein, a cover portion having top and front walls and spaced side walls exteriorly slidably disposed with respect to said first mentioned side walls, said cover side walls having rearward facing marginal faces complemental in shape to the forwardly facing faces of said body portion, said body portion having at the upper rear portion of the side walls a pair of axially aligned pivotal connections and said cover portion having a pair of elongated slots extending along said marginal faces, said slots and said pivotal connections being in slidable engagement for preventing separation of said cover and body portions and permitting positioning said cover portion as a support for said body portion at a plurality of tilted positions of said body portion, the side walls of said cover portion having grooves aligned with said grooves, and a U-shaped member having separable arms pivotally connected to said body portion and simultaneously engageable in said grooves on said body and said cover portions.

12. An instrument case having a body portion provided with bottom, rear and opposite side walls and an upright instrument supporting panel between said side walls, each of said side walls having on the exterior thereof forwardly and rearwardly facing curved faces, said side walls having parallel grooves therein, a cover portion having top and front walls and spaced side walls exteriorly slidably disposed with respect to said first mentioned side walls, said cover side walls having rearwardly facing marginal faces complemental in shape to the forwardly facing faces of said body portion and in engagement therewith in the closed position of said cover portion, said cover portion having in the side walls thereof grooves aligned in closed position of said cover with said first mentioned grooves, said body portion having at the upper rear parts of the side walls a pair of axially aligned pivotal connections, and said cover portion having a pair of elongated slots with catch projections extending along said marginal faces, said slots and said pivotal connections being in slidable engagement for preventing separation of said cover and body portions and permitting positioning said cover portion as a support for said body portion at a plurality of tilted positions of said body portion, and a U-shaped handle having resilient separable arms slidably pivotally connected to said body portion and simultaneously engageable in said grooves in the closed position of said cover portion.

References Cited in the file of this patent
UNITED STATES PATENTS

| | | |
|---|---|---|
| 335,069 | Graves | Jan. 26, 1886 |
| 803,485 | Higgins | Oct. 31, 1905 |
| 1,247,848 | List | Nov. 27, 1917 |
| 1,651,804 | Bosch | Dec. 6, 1927 |
| 2,131,093 | Cage | Sept. 27, 1938 |
| 2,628,752 | Corkish | Feb. 17, 1953 |

UNITED STATES PATENT OFFICE

CERTIFICATE OF CORRECTION

Patent No. 2,897,034                                  July 28, 1959

George H. Kalen

It is hereby certified that error appears in the printed specification of the above numbered patent requiring correction and that the said Letters Patent should read as corrected below.

Column 4, line 2, for "said walls" read — side walls —.

Signed and sealed this 15th day of December 1959.

(SEAL)
Attest:

KARL H. AXLINE
Attesting Officer

ROBERT C. WATSON
Commissioner of Patents